A. E. CHAMPAGNE.
DOUBLE FEED SCREW FOR CHANNELERS.
APPLICATION FILED JAN. 18, 1909.
982,478.
Patented Jan. 24, 1911.
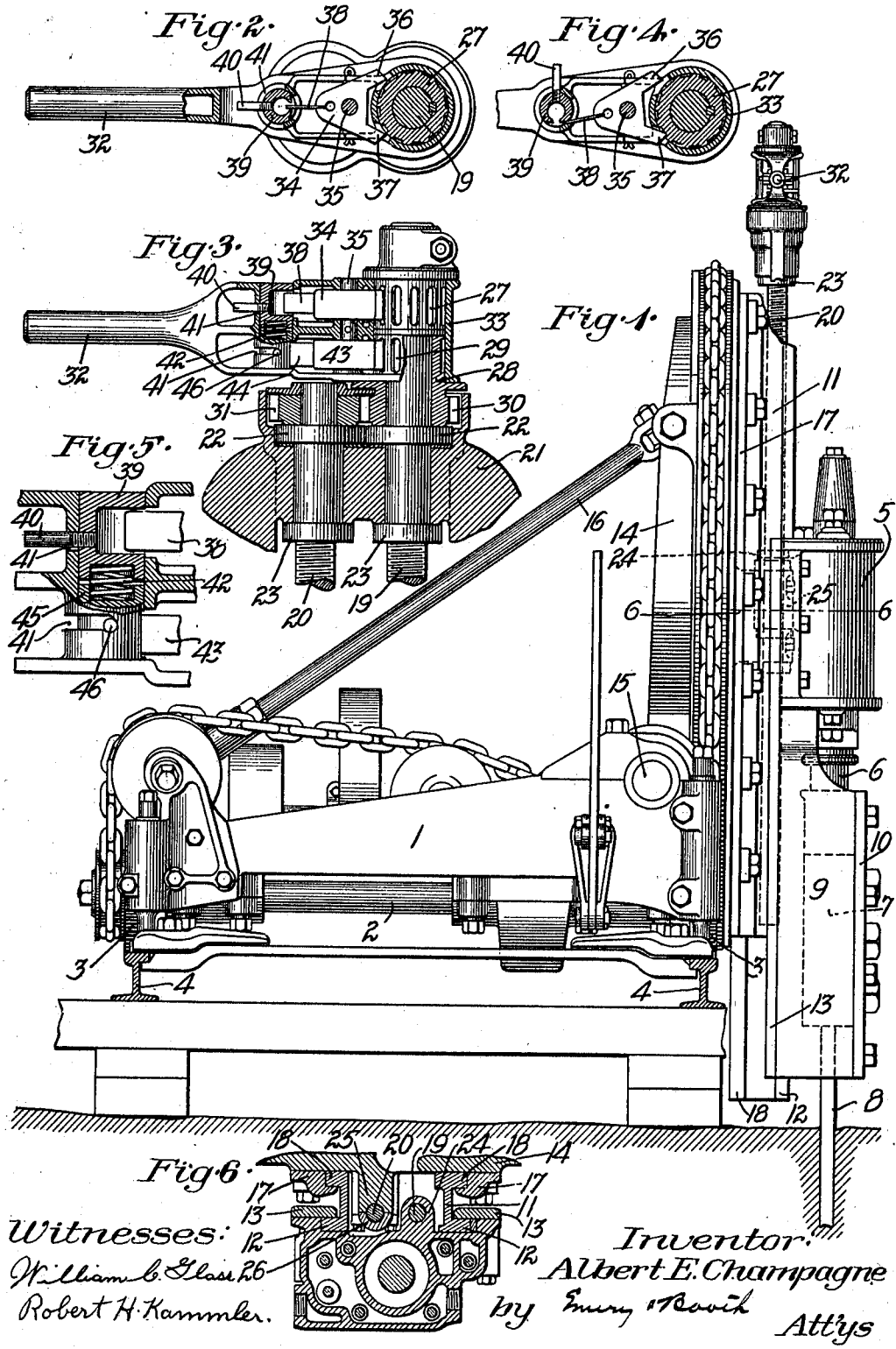

UNITED STATES PATENT OFFICE.

ALBERT E. CHAMPAGNE, OF CLAREMONT, NEW HAMPSHIRE, ASSIGNOR TO SULLIVAN MACHINERY COMPANY, OF CLAREMONT, NEW HAMPSHIRE, A CORPORATION OF MAINE.

DOUBLE FEED-SCREW FOR CHANNELERS.

982,478.     Specification of Letters Patent.    Patented Jan. 24, 1911.

Application filed January 18, 1909. Serial No. 472,829.

*To all whom it may concern:*

Be it known that I, ALBERT E. CHAMPAGNE, a citizen of the United States, and residing at Claremont, in the county of Sullivan and State of New Hampshire, have invented an Improvement in Double Feed-Screws for Channelers, of which the following description, in connection with the accompanying drawings, is a specification, like letters on the drawings representing like parts.

My invention relates to stone working machines, being more particularly concerned with the provision of improved tool feeding devices.

My invention will be best understood by reference to the following description when taken in connection with the accompanying illustration of one specific embodiment thereof, while its scope will be more particularly pointed out in the appended claims.

In the drawings: Figure 1 is a side elevation of a channeling machine embodying one form of my invention; Fig. 2 is a sectional detail in plan, on a larger scale, illustrating parts of the feed screw mechanism; Fig. 3 is a central, longitudinal section in elevation showing the same parts; Fig. 4 is a detail in plan similar to Fig. 2, but showing the pawl in operative relation to the ratchet; Fig. 5 is a detail in elevation and partial section showing one of the pawl controlling blocks; and Fig. 6 is a section in plan, partly broken away, taken on the line 6—6 in Fig. 1.

Referring to the drawings and to the embodiment of my invention therein shown, the same is illustrated as applied to a form of track channeling machine supported upon a carriage or frame-work 1. The latter is provided at its opposite ends with transverse shafts 2 carrying flanged wheels 3 which run upon the rails 4 customarily laid along the quarry bottom.

The machine carries suitable tool reciprocating motive means, which may be of any suitable form, but which herein comprises a fluid-pressure-operated, direct acting engine 5 supplied with pressure fluid from any suitable source (not shown) and having its piston rod 6 connected to the crosshead 7 and the tool or gang of tools 8. The crosshead 7 is reciprocated within crosshead guides 9, which latter are provided with gibs 10, overlying the crosshead and are rigidly connected to the cylinder 5 to form therewith a frame adjustable as a unit toward or from the work.

The sliding frame, which includes the tool-actuating engine and crosshead guides together with the crosshead and connected tools, is guided during its sliding movement upon a standard or intermediate supporting plate 11, which latter presents finished guideways or webs 12 (Fig. 6) adapted to receive the inner finished walls of the frame, gibs 13 being secured to the frame, as by the clamping bolts shown, to overlie the inner edges of the webs and retain the sliding frame thereon.

The intermediate supporting plate 11 is itself secured to a main supporting plate 14 carried at the side of the truck by connections which also permit of its sliding adjustment toward or from the work. In the illustrated form of machine the main supporting plate, as is customary, is adjustably mounted upon the trunnion shaft 15 extending lengthwise the machine, so that the usual adjustment for angle cutting may be had, the support being held in its adjusted position by suitable brace rods 16.

The intermediate supporting plate 11 is guided for sliding movement along the face of the main support by means of the gibs 17, which extend across the said plate and are bolted thereto as shown in Figs. 1 and 6. These gibs overlie finished webs 18 on the intermediate support so that the latter is kept in secure alinement at all times, being adjustable toward or from the work by devices hereinafter described.

Preferably devices are provided whereby both the intermediate support and the engine frame may be fed toward or from the work either independently or together, as desired. For this purpose there are provided herein two feed screws 19 and 20, the former for feeding the engine frame and the latter for adjustably feeding the intermediate supporting plate. These screws near their upper ends pass through the arched portion 21 of the intermediate support, and are provided each with upper and lower collars 22 and 23, respectively, which abut against opposite sides of the arch piece so as to prevent longitudinal movement of the screws relatively thereto. Near its lower end (see Fig. 6) the engine feed screw 19 has threaded engagement with a nut formed in a lug 24 carried by the engine cylinder so that the turning of the said feed screw acts to adjust the engine frame along the standard. The feed screw 20, on the other hand, at its lower end has threaded engagement with a fixed nut carried by the main support 14, such nut being formed by a lug such as 25 to which is bolted the removable cap piece 26. Movement of the feed screw 20, therefore, acts to adjustably slide the intermediate supporting plate or frame along the face of the main support.

To impart turning movement to the feed screws, the feed screw 19 has fixedly secured to its upper end the ratchet 27, while immediately beneath the same, loosely journaled on the unthreaded end of the feed screw 19, is a sleeve 28, the latter being cut at its upper end to form the ratchet 29 and at its lower end to form the gear 30. The gear 30 meshes with the gear 31 fixedly secured to the end of the feed screw 20, so that when the ratchet 29 is turned, the feed screw 20 will also be turned by means of the intermeshing gears.

While the feed screws may be turned by wholly independent means, herein there is provided a single ratchet handle 32 whereby the two ratchet wheels may be turned at will either separately or together and in either direction. To this end, the ratchet handle has a sleeved portion 33 which embraces the two ratchet wheels 27 and 29 and carries therein suitable pawls, one for each, as well as devices for throwing said pawls into or out of engagement at will.

The pawls and their controlling devices being substantially similar, reference need be made to the construction of but one. Referring to the upper pawl 34 adapted to engage with the ratchet 27 for the engine feed screw, the same is pivoted at 35 and is formed with oppositely arranged but similarly shaped teeth 36 and 37, either of which may be thrown into engagement with the ratchet wheel 27. Each pawl, therefore, is double acting, so that when thrown to one position it serves to move the ratchet in one direction and when thrown to the other position in the opposite direction.

To control the movement of the pawl, the latter is provided with a leaf spring 38 extending rearwardly, being located, when the pawl is out of use, between the jaws of the pawl-controlling block 39 which is swiveled in the handle casing and cut away to receive the spring and present thereto a pair of crescent shaped jaws. The block is provided with a pin 40 which works in a slot 41 in the surrounding walls of the handle casing. The slot is provided with a pocket or depression at each end and also near its mid-portion, and the controlling blocks for the two pawls are forced apart by a spring 42 so that when turned to its mid-position shown in Fig. 2 or to one of the extreme positions as shown in Fig. 4, the pin 40 slips into one of the groove depressions and prevents accidental displacement of the block from that position.

In the position of the block shown in Fig. 2, the spring is so related to the opposing jaws of the block that the tooth is held out of engagement with its ratchet, no matter what movement is imparted to the handle. If the pin 40, however, be moved to the position shown in Fig. 4, the spring is thrown to one side, where it is pressed by the flat face of one of the jaws, this resulting in throwing the tooth 36 of the pawl into engagement with the ratchet, so that reciprocatory movement of the ratchet handle will effect a right-handed turning movement of the feed screw 19. On the other hand, the movement of the pin 40 from the position shown in Fig. 4 through 180° will operate to throw the pawl with its tooth 37 into engagement with the ratchet, so that movement of the ratchet handle will thereupon effect a left-handed turning movement of the feeding worm. It will be obvious that the lower pawl 43 provided for the ratchet wheel 29 is provided with its spring 44, controlling block 45 and controlling pin 46, all of which serving the same purpose as the parts already described, so that the ratchet feed for the feed screw 20 may be rendered effective or ineffective at will and for turning movement in either direction.

It will be noted that the two pawls may be so set that their respective feeding screws may be turned either in the same direction or in opposite directions, so that the feeding effect of the two screws may be either cumulative or differential. By suitably selecting the pitch of the two screws, therefore, a cumulative feed or differential feed may be obtained.

The auxiliary feed described is of great advantage, particularly in angle cutting where the standard or support is arranged at an inclination either laterally or lengthwise the truck. In the operation of the machine the feed screw for the engine frame may be first brought into action until its limit of feed is reached, after which the feed may be continued by the advancement of the intermediate support. This increases the range of tool feed thereby making it necessary to change the tool gangs less frequently while at the same time, by advancing the intermediate support the action of the tool is rendered more effective by stiffening its guiding support close to the work.

While I have herein shown and described one specific form of my invention for purposes of illustration, it is to be understood that the same is not limited to the details of construction or relative arrangement of parts herein shown, but that extensive deviations may be made therefrom without departing from the spirit of the invention.

Having thus described my invention, what I claim is:

1. In a channeling machine the combination with a truck, a supporting standard at the side thereof, said standard being adjustable to present the cutting tools at different inclinations, a cutting unit comprising an engine cross head and a connected tool gang, a sliding frame on which said cutting unit is mounted, said frame presenting cross head guides to said cross head, an intermediate support on which the said frame is slidable, said intermediate support being adjustable on the main support, and means to adjust both the sliding frame and the intermediate support in the direction of the work, comprising parallel feed screws, one interposed between the standard and the intermediate support and the other between the intermediate support and the frame, and means for turning said feed screws.

2. In a channeling machine the combination with a truck, a supporting standard at the side thereof, said standard being adjustable to present the cutting tools at different inclinations, a tool-actuating unit, a sliding frame carrying said unit, an intermediate support on which said frame is slidable, said intermediate support being in turn slidable on said standard, and means for adjusting said frame and intermediate support in the direction of the work, said means comprising a pair of feed screws, one serving as a connection between the standard and the intermediate support, and the other as a connection between the intermediate support and the sliding frame and means for operating said feed screws.

3. In a channeling machine the combination with a truck, a supporting standard at the side thereof, said standard being adjustable to present the cutting tools at different inclinations, a tool-actuating unit, a sliding frame carrying said unit, an intermediate support on which said frame is slidable, said intermediate support being in turn slidable on said standard, means for adjusting said frame and intermediate support in the direction of the work, said means comprising a pair of feed screws, one serving as a connection between the standard and the intermediate support and the other as a connection between the intermediate support and the sliding frame, and a single operating member for controlling both said feed screws.

4. In a channeling machine the combination with a truck, a supporting standard at the side thereof, said standard being adjustable to present the cutting tools at different inclinations, a tool-actuating unit, a sliding frame carrying said unit, an intermediate support on which said frame is slidable, said intermediate support being in turn slidable on said standard, means for adjusting said frame and intermediate support in the direction of the work, said means comprising a pair of feed screws, one serving as a connection between the standard and the intermediate support and the other as a connection between the intermediate support and the sliding frame, and ratchet means for turning said feed screws, and a single operating lever for operating said ratchet means.

5. In a channeling machine the combination with a truck, a supporting standard at the side thereof, said standard being adjustable to present the cutting tools at different inclinations, a tool-actuating unit, a sliding frame carrying said unit, an intermediate support on which said frame is slidable, said intermediate support being in turn slidable on said standard, means for adjusting said frame and intermediate support in the direction of the work, said means comprising a pair of feed screws, one serving as a connection between the standard and the intermediate support and the other as a connection between the intermediate support and the sliding frame, and means for differently combining said feed screws to provide a different effective feeding movement for the cutting unit.

6. In a channeling machine the combination with a wheeled truck, an upright standard at the side thereof, adjustable about the axis lengthwise the truck to present the tools at different inclinations to the work, a cutting unit comprising an engine and a connected tool guide, a sliding frame on which said cutting unit is carried, an intermediate support on which said frame is slidably mounted, said frame being prolonged into an overhead arched portion, a pair of feed screws carried by said arched portion and engaging one the sliding frame and the other the standard, and means for turning said feed screws.

In testimony whereof, I have signed my name to this specification, in the presence of two subscribing witnesses.

ALBERT E. CHAMPAGNE.

Witnesses:
E. J. BURCHARD,
J. A. BRUCE.